Dec. 29, 1936. F. L. RE QUA 2,066,123
WELDING APPARATUS
Filed May 19, 1931  2 Sheets-Sheet 1

INVENTOR:
FREDERICK L. RE QUA
BY
*Baldwin Vale*
ATTORNEY.

Dec. 29, 1936.                F. L. RE QUA                2,066,123
                            WELDING APPARATUS
                            Filed May 19, 1931              2 Sheets-Sheet 2

INVENTOR:
FREDERICK L. RE QUA.
BY Baldwin Dale
ATTORNEY.

Patented Dec. 29, 1936

2,066,123

UNITED STATES PATENT OFFICE 2,066,123

WELDING APPARATUS

Frederick L. Re Qua, San Francisco, Calif., assignor to Steel-Weld Equipment Corporation Ltd., San Francisco, Calif., a corporation of California Application May 19, 1931, Serial No. 538,463

23 Claims. (Cl. 219—8)

My invention relates to welding apparatus, and especially to apparatus of portable or semi-portable type adapted for use in welding or repairing rails and the like, where much of the work must be done at a distance from any power line or other permanent power source.

Among the objects of my invention are: To provide welding equipment wherein the power source is adapted to provide the energy for all auxiliary equipment necessary to complete a repair; to provide a welding equipment capable of handling varying loads, i. e., of supplying current either to one or to a plurality of welding arcs; to provide a welding power plant of minimum weight for the power supplied; to provide an equipment wherein it is possible to compensate for the drop in potential introduced by long lengths of portable line between the generating apparatus and the work circuit; to provide welding apparatus wherein no dangerous voltages are imposed upon the lines should the welding arc break; to provide an equipment with minimum power loss in the relatively long lines required; and to provide an equipment wherein the circuit characteristics are such as to give maximum stability and regulation of the welding arcs.

Other objects of my invention will be apparent or will be specifically pointed out in the description forming a part of this specification, but I do not limit myself to the embodiment of my invention herein described, as various forms may be adopted within the scope of the claims.

Referring to the drawings.

Figure 1:
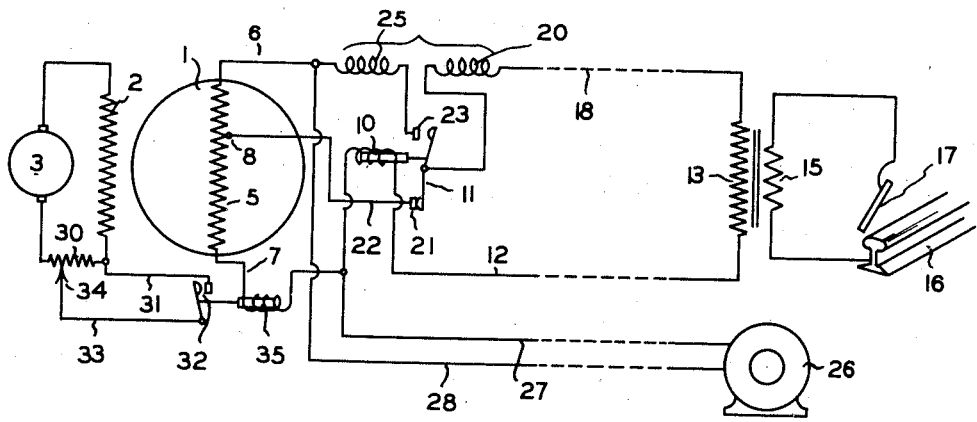
Figure 1 is a circuit diagram illustrating a single phase generator supplying a single welding circuit and an auxiliary tool.

The building up of rail ends which have been worn or battered down by the passage of railway traffic has been practiced as a repair measure for a number of years. In performing this work, the worn end of the rail is first built up by the electrical welding process and is then ground smooth and the end between the rails notched to prevent peening over and destruction of the weld. The weld itself may be made either with direct or with alternating current, but the latter possesses material advantages in convenience and economy of power. As is well known, any arc is unstable unless provided with a ballast impedance effectively in series therewith, and if direct current is used this must be resistive and consume energy, whereas with alternating current better results are obtained if the ballast be as nearly as possible purely reactive, and hence consumes little or no actual energy.

Power is seldom available along a railroad right of way, and therefore a generator and prime-mover, usually a gasoline engine, must be provided to supply current for the repair arcs. The arcs, themselves, consume approximately 300 amperes at 30 volts, so the generating equipment is necessarily heavy, and this means that it must be mounted upon a car or platform. The right of way must not be blocked during the repair work, so the car must be run onto a take-off track while the repair work is being done, and since this takes time, and repairs must be made at each rail joint, at an average of fifteen feet apart along the track, it is advisable that the generating equipment be moved not more than once for each day's work, and that a relatively long portable cable be used to transmit energy between the generator and the actual site of the repair.

If direct current be used, the losses in a quarter of a mile of cable, comprising two No. 3, B & S gauge conductors and supplying an arc consuming 9 kilowatts, is approximately 45 kilowatts demanding a 55 or 60 kilowatt generator to carry the load. If alternating current be used, with a step-down transformer of 3:1 ratio at the weld, the transmission loss between generator and weld with the same cable is but 5 kilowatts, and only 17 kilowatts in generator and engine capacity are required to supply the same load. Moreover, the auxiliary circuit required for grinding a completed weld, notching the rail ends, etc., is much more conveniently supplied by alternating current.

Where alternating current has been used in the past, welding generators giving a substantially constant current but variable voltage output have been used to supply the arc circuits, and a separate generator of constant potential characteristics used to supply the auxiliary tool. This again has led to an increase in weight in the entire apparatus, and has prevented more than a single arc circuit being supplied by a single generator.

The necessity for a ballast impedance in series with the arc circuits results in wide variations in voltage across the arc terminals. When the arc is in operation, this potential is but thirty or forty volts, but when the arc breaks the potential may rise to two or three times this value, while on the primary side of the step-down transformer, potentials of two to three hundred volts may occur. Since welding must be done in the open, and in all kinds of weather, such voltages are dangerous to the operator, and means must be taken to prevent their occurrence and at the same time permit the striking of the arc.

Broadly considered, the arc welding equipment of my invention comprises a source of substantially constant potential, which is tapped to provide two different voltages. This source supplies the line connecting with the step-down transformer and work circuit, which line is connected in series with a current-limiting reactor, preferably located at the source end of the line. When no current is flowing, the line is connected to the low potential tap on the source, and current actuated means are provided for connecting the line to the high potential tap when the arc circuit is completed and current flows. There is preferably a second reactor in series with the high potential tap, so that the current flowing in the line is limited to the same value when connected to either tap, and, in order to conserve weight, this second reactor is preferably coupled magnetically with the one which is permanently connected in series with the line. Where the potential source is a portable generator connected with a gas engine or other prime-mover, it is preferable that constant potential characteristic be maintained by varying the operation of the machine, rather than by its inherent regulation, since the latter requires an excessive weight of copper and iron, and hence current operated means are provided, responsive to current flow in the line, for overcoming the normal potential drop of the generator, and even in the long lengths of line, when current flows.

The first figure of the drawings is a diagram illustrating the equipment of my invention in perhaps its simplest form. An alternating current generator 1, which is driven by a suitable prime-mover not shown in this figure, has its field 2 supplied by an exciter 3.

The armature winding 5 of the generator is connected to the leads 6 and 7, and is also provided with a low voltage tap 8. The lead 7 connects through a series coil 10 of a double throw contactor 11, to one conductor 12 of the cable connecting to the primary winding 13 of a step-down transformer whose secondary 15 connects on one side with the work 16 to be repaired, and on the other side with the welding electrode 17. The other side of the primary 13 connects through the conductor 18 of the cable to a reactance coil 20, and thence to the arm on the contactor 11.

When the current coil 10 of the contactor is not excited, the latter connects through a back contact 21 and the lead 22 to the low voltage tap 8 of the generator. When the current coil is actuated the arm connects with the contact 23, and thence through the second reactance coil 25, to the lead 6 and the high potential terminal of the generator.

It is highly desirable that the impedance of the reactor coils 25 and 20 have as small a resistive component as possible. The voltage drop across the arc itself is in phase with the current. If the impedance were largely resistive, the drop across it would be in phase with the current, and at the instant of minimum current through the arc, when the gases are cooling rapidly and its resistance rising, there would be no voltage available to re-start it in the opposite direction. With a reactance in circuit to keep the current flowing at the instant of minimum voltage across the arc, much greater stability is obtained.

It is also highly desirable that the current-voltage characteristic of the reactor be as nearly linear as possible, and this necessitates a reactor which either has an iron core including a relatively large air gap, or, preferably, an air-core reactor, which wholly obviates saturation effect in the core with resultant non-linear characteristics.

In view of the necessity for low weights in portable equipment of this character, the two reactance coils are coupled as closely as possible, so that when the coil 25 is in circuit its field is effectively completely inter-linked with that of the reactor 20. Under these circumstances, the reactance of the combined coil is approximately proportional to the square of the combined number of turns, and a saving of at least 50% in weight is effected over the use of two entirely separate reactors.

The auxiliary tool utilized in connection with the repair process is symbolized by the motor 26 which is connected through a line 27 and 28 to the leads 6 and 7. Due to the constant potential characteristics of the generator, the speed and effectiveness of the motor are not affected by the operation of the arc.

The obtaining of constant potential characteristics, in generators where light weight is a primary factor, is difficult, and hence auxiliary means are provided for overcoming the potential drop. In series between the exciter 3 and field coil 2 of the generator, is a resistor 30. One side of this resistor connects through a lead 31 to a contactor 32. The other terminal of this contactor connects through a lead 33 to a variable tap 34 on the resistor. The contactor 32 is operated by a coil 35 in series with the line 7, this contactor preferably being set so as to be inoperative under the relatively small load imposed by the auxiliary apparatus 26. Current in the arc circuit is, however, sufficient to actuate the contactor, shorting out a portion of the resistor 30 and bringing the voltage of the generator back to its normal value and thus overcoming the drop caused by the load.

The resistor may even be set so as to overcompensate, it being preferable to adjust the variable contact 34 to overcome the drop in the conductors 12 and 18, and thus maintain substantially constant conditions at the terminals of the step-down transformer.

In the operation of the apparatus before the arc is struck, the circuit conditions shown in the diagram obtain. When the electrode 17 is contacted with the work, current flows in the line, exciting the coil 10, opening the contact 21, and closing the contact 23 to provide full voltage for the arc when the electrode 17 is drawn away from the work.

In order that the portion of the armature winding between the top 8 and the conductor 6 may not at any time be short-circuited, it is necessary that an instant intervene between the opening of the contact 21 and the closing of the contact 23. During this slight interval the current through the coil 10 is interrupted, and therefore a contactor is used which has sufficient inertia to carry forward after its excitation, and close the upper contact during this instantaneous interruption. Current through the coil 10 is then immediately re-established, and the high voltage connection remains closed.

At the same time that this action is occurring, the coil 35 closes the contactor 32 and holds the potential of the generator up to normal, thus permitting uninterrupted use of the auxiliary apparatus 26.

Figure 4:
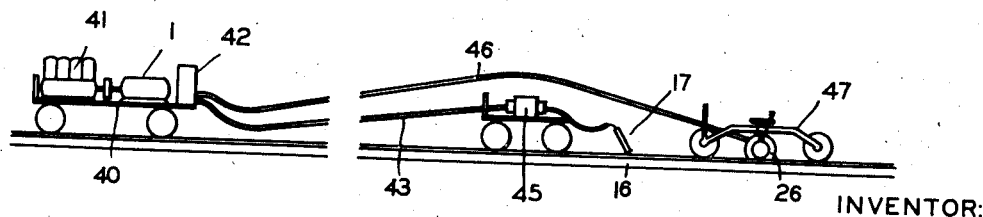
Figure 4 is a schematic diagram illustrating the location of a portable welding generator with its accompanying portable transmission line, step-down transformer, welding circuit, and auxiliary grinder or other tool.

Figure 4 shows in schematic form the actual physical layout of the apparatus just described. The generator 1, mounted with its prime-mover 41 and control panel 42, on a suitable truck or car 40, is usually placed on a take-off track approximately mid-way of the section to be repaired during the day or other suitable operating period.

From the generator the long cable 43, which comprises the conductors 18 and 12, runs to the step-down transformer 45 feeding the welding electrode 17 and rail 16. An entirely separate cable 46 supplies the track grinder 47, on which the motor 26 is mounted. Due to the much smaller current required in this cable, its conductors may be lighter and hence are subject to less abrasion and chance of failure than those of the cable 43, so that potentials which would be quite unsuitable and dangerous on the larger cable, do not possess the same element of danger in the lighter one.

Figure 2:
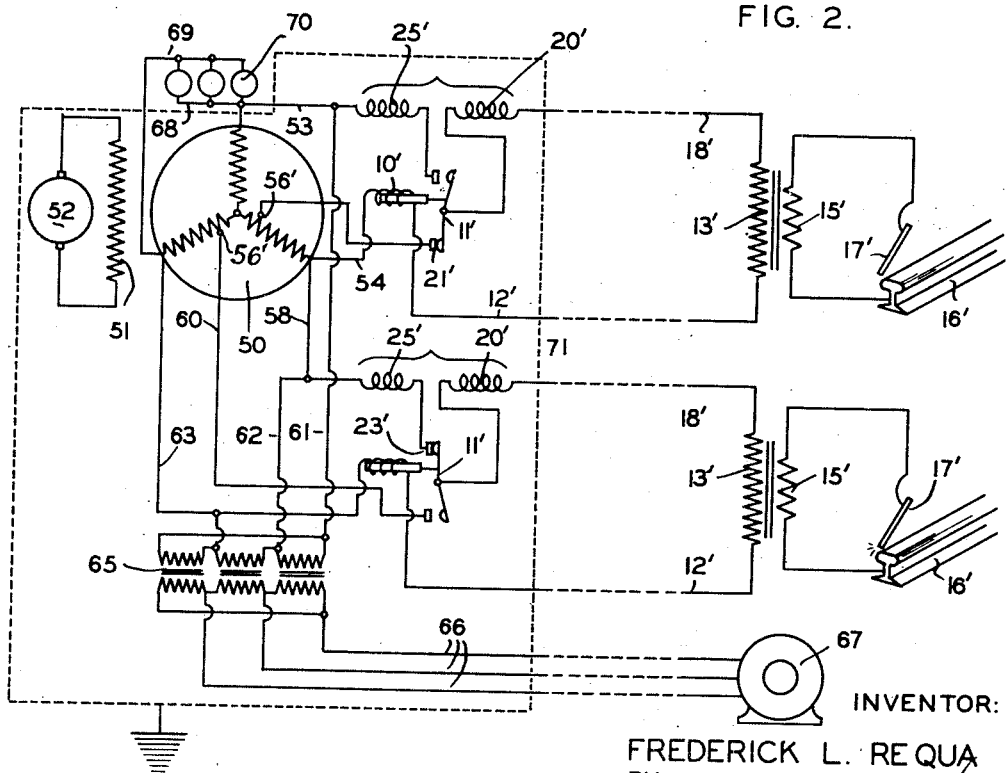
Figure 2 is a similar circuit diagram illustrating a three-phase welding generator supplying a plurality of welding circuits together with various auxiliary circuits.

Figure 2 shows an embodiment of my invention which is more suitable for heavy duty work. This arrangement comprises a three-phase generator 50 whose field 51 is supplied by the usual exciter 52. Leads 53 and 54, connected across one phase of the generator, correspond to the leads 6 and 7 in Figure 1. Although either a delta or star connected generator may be used, the star connection is shown in the figure, the tap 56 on one leg of the winding corresponding with the tap 8 in Figure 1 to supply the lower potential tap to which the line is connected when the arc is not in operation. The circuit from these three leads to the work circuit being the same as shown in the single phase case, the same reference characters, distinguished by accent, are used to indicate the parts, comprising the current coil 10', circuit breaker 11', conductors 12' and 18', transformer primary 13' and secondary 15', work 16', welding electrode 17', and reactor coils 20' and 25'.

A second arc circuit may be derived across another phase of the generator, being connected to leads 58 and 60. This circuit may be identical in all respects with that connected to the leads 53 and 54, and is indicated by similar reference characters, the only difference shown being that one of the circuits is indicated with the arc broken, while the other is shown with the arc struck and the contactor 11' contacting with the high potential tap 23' instead of to the low potential tap 21' as in the case of the other phase.

The circuit for operating the auxiliary tool in the three-phase system is shown as fed by leads 61, 62 and 63, which feed a three-phase transformer bank 65, supplying a cable 66 which connects with a three-phase motor 67. The otherwise unloaded phase of the generator 50 is shown as feeding leads 68 and 69, which connect to the incandescent lighting circuit 70, or other single phase load. It is obvious that a third arc circuit could be supplied from this phase.

The dotted line 71 indicates a grounded protective shield which prevents the operators of the equipment contacting with high potential equipment. In connection with the use of transformers to step-down the higher voltage for use in the auxiliary tool, it will be seen that this expedient may equally well be adapted in a single phase equipment of Figure 1. The means for increasing the excitation of the generator to overcome the voltage drop due to load of the arc circuit is not shown in this figure, but it is plain that this may be incorporated as readily in the three-phase equipment as in the single phase, separate sections of resistance being provided to be shorted out by the operation of the different arc circuits.

Figure 3:
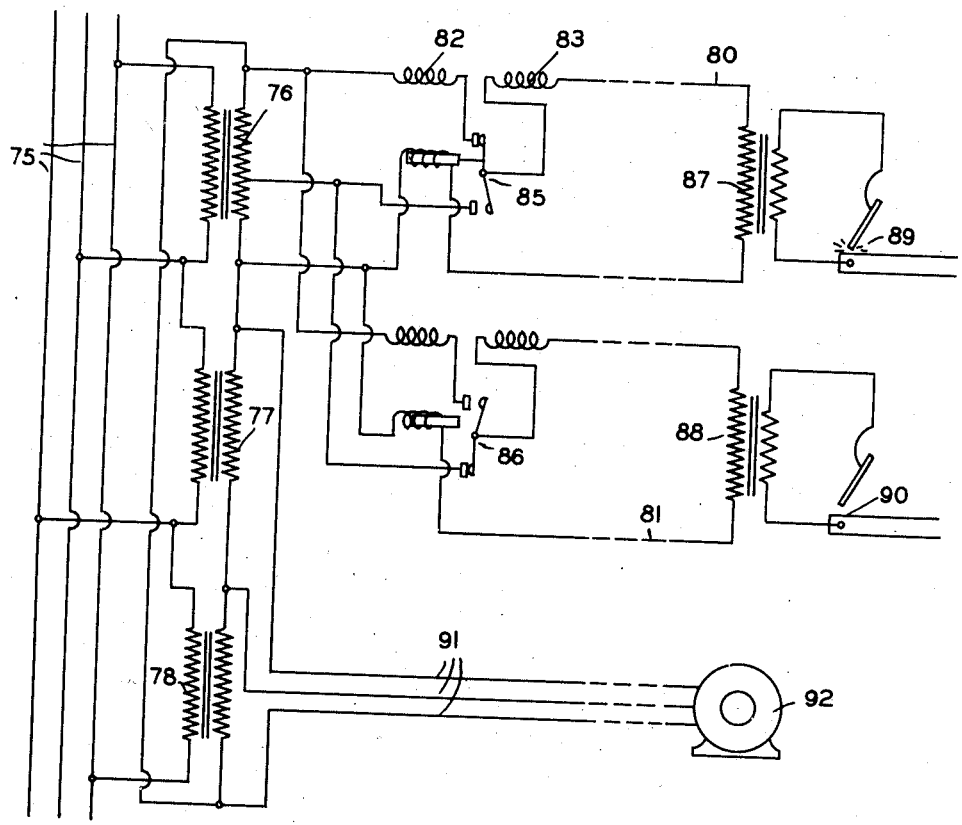
Figure 3 is a circuit diagram illustrating a welding circuit constructed in accordance with my invention, deriving its power from a three-phase power main, and feeding a plurality of welding circuits and an auxiliary circuit.

Another modification of my invention is shown in Figure 3, wherein the power is supplied by a three-phase power line 75 to a heavy duty transformer 76 and two lighter transformers 77 and 78 comprising a three-phase, delta-connected bank. Two welding circuits 80 and 81 respectively are connected in parallel across the secondary of the transformer 76, each of these circuits being similar in layout to the welding circuit shown in Figure 1, with the exception that the reactance coils 82 and 83 are not shown as coupled. As was explained above, the effect of the coils being so arranged is in no wise different from that of the coupled coils, except in the greater amount of copper required to give the same effective reactance. The contactors 85 and 86 transfer the load from the low to the high potential tap of the transformer 76 in the same manner as the contactor 11 of the first figure, to supply current through the transformers 87 and 88 to the arcs 89 and 90. The delta-connected secondaries of the transformers 77 and 78 combine with the secondary of the transformer 76 to supply three-phase current through the cable 91 to the auxiliary tool 92.

This last described arrangement may be utilized where a commercial power line is available. The connection has some advantage as regards weight in comparison with a transformer circuit in which each arc is supplied from a separate phase as is the case with the arrangement in Figure 2, but either connection scheme may be used with either type of source; i. e., arc circuits may be connected in parallel with one phase of a polyphase generator, or, on the other hand, connected to separate phases of a transformer bank. Other phase relationships and means of connection will be obvious to those skilled in the art.

I have found that the type of equipment described herein possesses great economy in weight, cost, and ease of operation, over the constant current systems in use heretofore for this purpose. Thus, a portable generator and control set built in accordance with my invention weighs only about one-fourth as much as a set of the older type designed for similar work, the comparative weights being approximately 2,200 and 8,500 pounds. The result is that fewer men are required to handle the equipment in moving it from the track to a take-off, the fixed investment is much lower, while the quality of work does not suffer. Furthermore, I find it advisable to utilize high speed, high frequency apparatus, since this saves in the weight of iron required for the cores, in the amount of copper required for the reactors, and in the weight of the auxiliary tools for a given power and temperature rise.

I claim:

1. An electrical welding circuit comprising the combination of a source of two different substantially constant alternating potentials, a work circuit, a line connecting said work circuit and said potential source, a reactor in said line for limiting the current flowing therein, and means responsive to the current flow in said line for transferring the connection thereof from the lower potential connection of said source to the higher potential connection thereof.

2. An electrical welding circuit comprising the combination of a substantially constant source of alternating potential having a higher potential tap and a lower potential tap, a reactor in series with said higher potential tap, a line connected with said potential source, a second reactor in series with said line, a work circuit supplied by said line, and means responsive to current flowing in said line for transferring the connection thereof from the lower potential tap to the higher potential tap of said source.

3. An electrical welding circuit comprising the combination of a substantially constant source of alternating potential having a higher potential tap and a lower potential tap, a reactor in series with said higher potential tap, a line connected with said potential source, a second reactor in series with said line and magnetically linked with said first reactor, a work circuit supplied by said line, and means responsive to current flowing in said line for transferring the connection thereof from the lower potential tap to the higher potential tap of said source.

4. An electrical welding circuit comprising the combination of a substantially constant source of alternating potential having a higher potential tap and a lower potential tap, a reactor in series with said higher potential tap, a line connected with said potential source, a second reactor having a substantially linear current-voltage characteristic in series with said line, a work circuit supplied by said line, and means responsive to current flowing in said line for transferring the connection thereof from the lower potential tap to the higher potential tap of said source.

5. An electrical welding circuit comprising the combination of a substantially constant source of alternating potential having a higher potential tap and a lower potential tap, an air-core reactor in series with said higher potential tap, a line connected with said potential source, a second air-core reactor in series with said line, a work circuit supplied by said line, and means responsive to current flowing in said line for transferring the connection thereof from the lower potential tap to the higher potential tap of said source.

6. An electrical welding circuit comprising the combination of a substantially constant source of alternating potential having a higher potential tap and a lower potential tap, an air-core reactor in series with said higher potential tap, a line connected with said potential source, a second air-core reactor having a substantially linear current-voltage characteristic in series with said line and magnetically linked with said first reactor, a work circuit supplied by said line, and means responsive to current flowing in said line for transferring the connection thereof from the lower potential tap to the higher potential tap of said source.

7. An electrical welding circuit comprising the combination of a substantially constant source of alternating potential having a higher potential tap and a lower potential tap, an air-core reactor in series with said higher potential tap, a line connected with said potential source, a second air-core reactor in series with said line and magnetically linked with said first reactor, a work circuit supplied by said line, and means responsive to current flowing in said line for transferring the connection thereof from the lower potential tap to the higher potential tap of said source.

8. An electrical welding circuit comprising the combination of a substantially constant source of alternating potential having a higher potential tap and a lower potential tap, a line, a work circuit supplied by said line, and a contactor actuated by current in said line for connecting the line to the high potential tap of said source, the inertia of said contactor being sufficient to complete the circuit to said high potential tap after an interruption following the actuation of said contactor from said low potential tap.

9. An arc-welding apparatus comprising a source of substantially constant potential alternating current having taps for supplying higher and lower potentials, a plurality of arc circuits, lines connecting each of said arc circuits with said source, a reactor in series with each of said lines, and means responsive to the current in the respective lines for transferring the connections thereof from a low potential tap to a high potential tap of said source.

10. An arc-welding apparatus comprising a source of substantially constant potential polyphase current having high and low potential taps on a plurality of phases thereof, a plurality of arc circuits, a line connecting each of said arc circuits with one of the tapped phases of said source, a reactor in each of said lines for limiting the current flow therein, and means responsive to current flow in the respective lines for transferring the connection of said lines from a low potential tap of said source to a high potential tap thereof.

11. An electrical welding circuit comprising an alternating current generator having taps for supplying high and low potentials, an arc welding circuit, a line connecting said arc welding circuit to the generator, and means controlled by making and breaking of the arc for connecting the arc welding circuit from one tap to the other.

12. A portable electrical welding circuit comprising a portable alternating current generator having taps for supplying high and low potentials, an arc welding circuit, portable cables connecting the arc welding circuit to said generator, means actuated upon making of the arc for connecting the arc welding circuit to the high potential tap from the low potential tap and upon breaking of the arc for connecting said arc welding circuit to the low potential tap.

13. An electrical welding circuit comprising a polyphase generator having taps for supplying high and low potentials, a plurality of arc welding circuits, lines connecting each of said arc welding circuits to the generator, and means actuated upon making of any of the arcs for connecting said arc welding circuits to the high potential tap from the low potential tap and upon breaking of the arcs for connecting said arc welding circuits to the low potential tap.

14. An electrical welding circuit comprising an arc welding generator, an arc welding circuit, means for connecting the arc welding circuit to said generator, an auxiliary work circuit, means for connecting the auxiliary work circuit to said generator, and means for supplying substantially constant circuit conditions to the auxiliary work circuit irrespective of the load on said generator imposed by the arc welding circuit.

15. An electric welding apparatus comprising a polyphase generator, an arc welding circuit, a line connecting said arc welding circuit to one phase of the generator, an auxiliary work circuit, a line connecting said auxiliary work circuit to a plurality of said phases, and switching means responsive to current change in the arc welding circuit whereby the current and voltage conditions in the arc welding circuit may be varied independently of the current and voltage conditions in the auxiliary work circuit.

16. An electric welding apparatus comprising a current generator of two substantially different potentials, an arc welding circuit connected with said generator and adapted to operate at one of said potentials, an auxiliary work circuit connected with said generator and adapted to operate at the other of said potentials, and means operable in accordance with the load conditions in one of said circuits for maintaining constant potential output from said generator when both of said circuits are in operation.

17. An electric welding apparatus comprising a source of current at unlike potentials, a heavy current drain arc welding circuit connected with said source and adapted to operate at one of said potentials, an auxiliary work circuit of lesser current drain connected with said source and adapted to operate at another of said potentials, and means associated with said source and operable in accordance with the current flowing in one of said circuits for maintaining an output of constant potential at said source regardless of whether one or more of said circuits are in operation.

18. In electric welding apparatus, an electrical circuit comprising a source of potential, a plurality of utilization circuits connected with said source, and means operable by current flow in one of said utilization circuits for altering the potential supplied thereto from said source independently of the potential supplied to the others of said utilization circuits.

19. The combination, in electric welding apparatus, of an alternating current source capable of supplying current at high and low potentials, means for connecting a high current utilization circuit to said source to operate at one of said potentials, means for connecting a low current utilization circuit to said source to operate at the other of said potentials, and means operable by current flow in one of said utilization circuits for altering, at said source, the potential applied to the other of said utilization circuits.

20. The combination, in electric welding apparatus, of an alternating current source capable of delivering current at differing potentials, a plurality of utilization circuits operable at one of said potentials connected with said source, a utilization circuit operable at another of said potentials, and switching means responsive to current flow in said first mentioned circuits for connecting said latter utilization circuit to said source to permit operation thereof at said differing potentials of said source.

21. An electric welding apparatus comprising a source of electricity tapped to provide current at different potentials, an arc welding circuit, an auxiliary work circuit connected with said source and operable at one of said potentials, and switching means for connecting said arc welding circuit to said source, said switching means being operable by current flowing in said arc welding circuit for changing the connection thereof with said taps of said source to provide operation of said circuit at said different potentials of said source.

22. An electric welding apparatus comprising a variable potential generator having taps for supplying current at different potentials, a plurality of utilization circuits, switching means connecting said circuits and said generator and operable by current flow in one of said circuits for changing the potential supplied to said circuit from said generator, and means operable by current flow in one of said circuits for varying the potential output of said generator.

23. The combination, in electric welding apparatus having an alternating current generator provided with taps to produce current at high and low potentials, output terminals normally connected to said low potential taps, utilization circuits connected to said terminals, and switching means operable in accordance with current flowing in one of said utilization circuits for switching the connection of said terminals from said low potential taps to said high potential taps.

FREDERICK L. RE QUA.